United States Patent
Quan

(10) Patent No.: US 7,859,580 B2
(45) Date of Patent: Dec. 28, 2010

(54) METHOD AND APPARATUS FOR ANISOTROPIC DEMOSAICING OF IMAGE DATA

(75) Inventor: Shuxue Quan, San Diego, CA (US)

(73) Assignee: Aptina Imaging Corporation, George Town (KY)

( * ) Notice: Subject to any disclaimer, the term of this patent is extended or adjusted under 35 U.S.C. 154(b) by 485 days.

(21) Appl. No.: 11/873,123

(22) Filed: Oct. 16, 2007

(65) Prior Publication Data

US 2009/0096899 A1 Apr. 16, 2009

(51) Int. Cl.
*H04N 5/335* (2006.01)

(52) U.S. Cl. .................. 348/273; 348/280; 348/311; 250/208.1; 382/205

(58) Field of Classification Search .............. 348/273, 348/280, 311; 250/208.1
See application file for complete search history.

(56) References Cited

U.S. PATENT DOCUMENTS

| | | | |
|---|---|---|---|
| 3,971,065 A | 7/1976 | Bayer | |
| 5,596,367 A * | 1/1997 | Hamilton et al. | ............ 348/272 |
| 6,140,630 A | 10/2000 | Rhodes | |
| 6,204,524 B1 | 3/2001 | Rhodes | |
| 6,310,366 B1 | 10/2001 | Rhodes et al. | |
| 6,326,652 B1 | 12/2001 | Rhodes | |
| 6,333,205 B1 | 12/2001 | Rhodes | |
| 6,376,868 B1 | 4/2002 | Rhodes | |
| 6,563,538 B1 * | 5/2003 | Utagawa | ............ 348/273 |

\* cited by examiner

*Primary Examiner*—Tuan Ho
*Assistant Examiner*—Yih-Sien Kao

(57) ABSTRACT

A method and apparatus for determining missing color pixel values in image data. Pixel values are interpolated in a horizontal or a vertical direction based on gradient scores and optionally chroma and local statistical scores. Several techniques for refining the interpolation direction determination are also disclosed, including applying a low-pass filter, applying one or more digital filters, and growing an interpolation direction region to nearby pixels. A technique for interpolating corner pixel values is also disclosed.

14 Claims, 10 Drawing Sheets

|      | r-2 | r-1 | r | r+1 | r+2 |
|------|-----|-----|---|-----|-----|
| c+2  | R   | G   | R | G   | R   |
| c+1  | G   | B   | G | B   | G   |
| c    | R   | G   | R | G   | R   |
| c-1  | G   | B   | G | B   | G   |
| c-2  | R   | G   | R | G   | R   |

|     | r-2 | r-1 | r | r+1 | r+2 |
|-----|-----|-----|---|-----|-----|
| c+2 | 1 | 1 | 1 | 1 | 1 |
| c+1 | 1 | 0 | 1 | 1 | 0 |
| c   | 0 | 1 | 0 | 1 | 1 |
| c-1 | 1 | 1 | 0 | 1 | 0 |
| c-2 | 0 | 0 | 1 | 1 | 1 |

FIG. 4A

|  | r-2 | r-1 | r | r+1 | r+2 |
|---|---|---|---|---|---|
| c+2 | 0 | 1 | 0 | 0 | 1 |
| c+1 | 0 | 1 | 1 | 0 | 1 |
| c | 1 | 1 | 1 | 0 | 1 |
| c-1 | 0 | 0 | 1 | 1 | 0 |
| c-2 | 1 | 1 | 0 | 1 | 1 |

|      | r-4 | r-3 | r-2 | r-1 | r | r+1 | r+2 | r+3 | r+4 |
|------|-----|-----|-----|-----|---|-----|-----|-----|-----|
| c+4  | 0   | 1   | 1   | 0   | 0 | 0   | 1   | 1   | 1   |
| c+3  | 1   | 1   | 0   | 1   | 0 | 1   | 0   | 1   | 0   |
| c+2  | 0   | 0   | 1   | 1   | 1 | 0   | 1   | 1   | 1   |
| c+1  | 1   | 1   | 1   | 0   | 1 | 1   | 0   | 0   | 1   |
| c    | 0   | 0   | 0   | 1   | 0 | 1   | 1   | 1   | 1   |
| c-1  | 0   | 1   | 1   | 0   | 0 | 1   | 0   | 0   | 1   |
| c-2  | 1   | 1   | 0   | 1   | 1 | 1   | 0   | 0   | 1   |
| c-3  | 0   | 0   | 1   | 0   | 1 | 1   | 0   | 0   | 1   |
| c-4  | 1   | 1   | 0   | 0   | 1 | 1   | 1   | 1   | 1   |

*FIG. 5B*

METHOD AND APPARATUS FOR ANISOTROPIC DEMOSAICING OF IMAGE DATA

FIELD OF THE INVENTION

The disclosed embodiments relate generally to image sensors and, more particularly, to methods and apparatuses for demosaicing image data.

BACKGROUND

Imagers typically consist of an array of pixel cells containing photosensors. Each pixel cell produces a signal corresponding to the intensity of light impinging on its photosensor when an image is focused on the array by one or more lenses. These signals may be stored in a memory and displayed on a monitor, manipulated by software, printed to paper, or otherwise used to provide information about the optical image. The magnitude of the signal produced by each pixel is substantially proportional to the amount of light impinging on a respective photosensor.

Several kinds of imagers are generally known. Complementary metal-oxide-semiconductor ("CMOS") imagers and charge coupled device ("CCD") imagers are among the most common. CMOS imagers are discussed, for example, in U.S. Pat. No. 6,140,630, U.S. Pat. No. 6,376,868, U.S. Pat. No. 6,310,366, U.S. Pat. No. 6,326,652, U.S. Pat. No. 6,204,524, and U.S. Pat. No. 6,333,205, all assigned to Micron Technology, Inc.

To allow an imager to capture a color image, the pixel cells must be able to separately detect values of light, for example, red (R) light, green (G) light, and blue (B) light. A color filter array is typically placed in front of the array of pixel cells so each pixel cell measures only light of the color of its respective filter. The most common type of color filter array, often referred to as the Bayer filter, is described in U.S. Pat. No. 3,971,065. As shown in FIG. 1, Bayer filters consist of alternating red and green filters in a first row and alternating blue and green filters in a second row. This pattern is repeated throughout the array. Thus, in an imager employing a Bayer filter, one-half of the pixels are sensitive to green light, one-quarter are sensitive to red light, and the remaining one-quarter are sensitive to blue light.

To provide a color image, however, red, green, and blue values are required for every pixel location. Thus, the two "missing" color values at each pixel location must be estimated. For example, the highlighted pixel in FIG. 1 at the intersection of row 3 and column 3 is sensitive to red light. Therefore, blue and green values must be estimated for this pixel location. This estimation process is often referred to as "demosaicing."

Several types of demosaicing methods are generally known. The simplest methods consider each color separately. For example, missing green pixel values are estimated based on nearby green pixel values. Bilinear interpolation is one such method and provides good results when applied to grayscale images. However, bilinear interpolation in color imaging often results in many visible artifacts (e.g., zipper effect or colored or blurred edges).

Bilinear interpolation and other standard interpolation methods treat each color independently. However, color images often exhibit a high degree of correlation among color channels. Several methods have been proposed to use this correlation to more accurately estimate missing color pixel values. One such method involves analyzing pixels around each missing color pixel value to determine whether the region exhibits a preferred interpolation direction. For example, in one implementation, pixel values from to the left of a missing color pixel value are subtracted from pixel values to the right of the missing color pixel value to determine a horizontal gradient score. Similarly, a difference between pixel values above and below the mixing color pixel value is computed to determine a vertical gradient score. By comparing the scores, these "edge-directed" methods attempt to determine whether the missing color pixel value should be interpolated horizontally, vertically, or both. In general, the interpolation direction is chosen to interpolate along edges rather than across edges.

Wrongly selecting the interpolation direction is a major source of error in edge-directed demosaicing methods. For example, if interpolation direction changes abruptly along an edge, a zipper effect occurs. Similarly, if an interpolation direction in a region of an image is random or difficult to determine, color aliasing occurs. Thus, there is a need in the art for an improved demosaicing method that provides, among other things, more accurate edge directionality selection and reduced color aliasing.

BRIEF DESCRIPTION OF THE DRAWINGS

FIG. 3A illustrates pixel locations whose values are used for interpolation in a horizontal direction in accordance with a disclosed embodiment.

FIG. 3B illustrates pixel locations whose values are used for interpolation in a vertical direction in accordance with a disclosed embodiment.

FIG. 4A illustrates pixel locations whose values are used during a digital filtering step in accordance with a disclosed embodiment.

FIG. 4B illustrates pixel locations whose values are used during a digital filtering step in accordance with an alternative embodiment.

FIG. 5A illustrates pixel locations whose values are used for interpolating a corner pixel value in accordance with a disclosed embodiment.

FIG. 5B illustrates pixel locations whose values are used to determine whether a missing pixel value is a corner in accordance with a disclosed embodiment.

DETAILED DESCRIPTION OF THE DISCLOSED EMBODIMENTS

In the following detailed description, reference is made to the accompanying drawings, which form a part hereof and show by way of illustration specific embodiments in which the invention may be practiced. These embodiments are described in sufficient detail to enable those skilled in the art to practice them, and it is to be understood that the disclosed embodiments may be modified and that other embodiments may be utilized without departing from the spirit and scope of the invention. The progression of steps described is an example and it should be noted that the sequence of steps is not limited to that set forth herein and may be changed as is known in the art, with the exception of steps necessarily occurring in a certain order.

Figure 2:
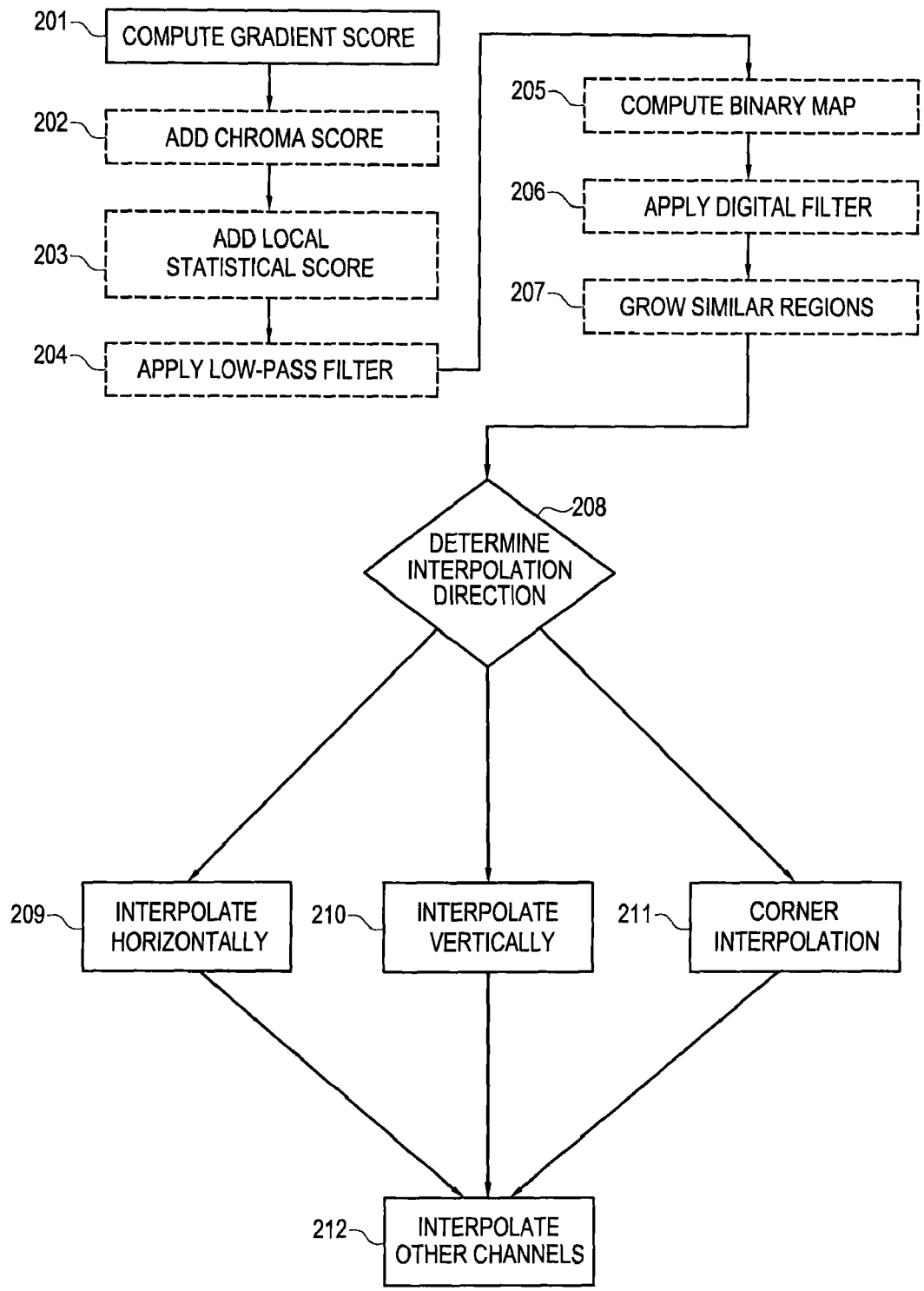
FIG. 2 is a flow chart illustrating a method in accordance with a disclosed embodiment.

FIG. 2 is a flow chart of a method in accordance with an embodiment disclosed herein. Optional steps are indicated by dashed boxes. The method includes determining whether to interpolate a color channel, e.g. the green channel, in a horizontal or vertical direction at step 208 based on scores computed at step 201 and, optionally, steps 202 and 203. Based on a result of step 208, each missing pixel value in the green channel is interpolated either horizontally or vertically at steps 209 or 210, respectively. At step 212, missing pixel values in the red and blue channels are interpolated based at least in part on a result of the green channel interpolation performed at step 209 or 210.

To reduce image artifacts, the interpolation direction for each missing pixel value must be carefully determined. For example and with reference to FIG. 1, an embodiment might begin by determining whether the missing green pixel value for the highlighted red pixel at row 3 and column 3 should be interpolated horizontally or vertically. As shown at step 201 of FIG. 2, this determination process begins by computing and comparing Gradient Scores in the horizontal and vertical directions. Gradient Scores attempt to detect edges within the image with the aim selecting an interpolation direction along, rather than across, edges.

The Gradient Score in the horizontal direction for the pixel at row r and column c, $D_{(r,c)}^h$, can be computed as follows:

$$D_{(r,c)}^h = S_{(r,c)}^h + \frac{S_{(r-1,c)}^h + S_{(r+1,c)}^h}{2} + \frac{S_{(r-2,c)}^h + S_{(r+2,c)}^h}{4} \quad (1)$$

$$S_{(r,c)}^h = |P_{(r,c-1)} - P_{(r,c+1)}| + |2P_{(r,c)} - P_{(r,c-2)} - P_{(r,c+2)}| \quad (2)$$

Formula (1) above contains several references to a function $S^h$, which is computed according to formula (2). Although only $S_{(r,c)}^h$ is expressly shown, $S^h$ for other parameters r and c can be computed by substituting other values for r and c, e.g. (r−1, c), (r+1, c), (r−2, c), and (r+2, c), throughout formula (2). For example, formula (1) references $S_{(r-1,c)}^h$. Substituting r−1 for r in formula (2) yields the following:

$$S_{(r-1,c)}^h = |P_{(r-1,c-1)} - P_{(r-1,c+1)}| + |2P_{(r-1,c)} - P_{(r-1,c-2)} - P_{(r-1,c+2)}| \quad (3)$$

Similar substitutions can be used to compute $S_{(r+1,c)}^h$, $S_{(r-2,c)}^h$, and $S_{(r+2,c)}^h$ in formula (1) and other functions referenced below.

In formulas (2) and (3) above and throughout this disclosure, the notation $P_{(r,c)}$ refers to the native pixel value for the pixel at row r and column c. Native means a pixel value associated with the color channel corresponding to the filter overlying the pixel. For example, if the pixel at row r and column c, underlies a red portion of a Bayer filter, then $P_{(r,c)}$ refers to a red channel pixel value. The notations $R_{(r,c)}$, $G_{(r,c)}$, and $B_{(r,c)}$ are used to refer to specific color channel pixel values of the pixel at row r and column c. These values may be native or previously estimated. Continuing the above example of a native red pixel at row r and column c, $G_{(r,c)}$ refers to an estimated green pixel value at that pixel location.

The Gradient Score in the vertical direction for the pixel at row r and column c, $D_{(r,c)}^v$, can be computed as follows:

$$D_{(r,c)}^v = S_{(r,c)}^v + \frac{S_{(r,c-1)}^v + S_{(r,c+1)}^v}{2} + \frac{S_{(r,c-2)}^v + S_{(r,c+2)}^v}{4} \quad (4)$$

$$S_{(r,c)}^v = |P_{(r-1,c)} - P_{(r+1,c)}| + |2P_{(r,c)} - P_{(r-2,c)} - P_{(r+2,c)}| \quad (5)$$

Figure 1:
FIG. 1 illustrates a portion of a pixel array overlaid with a Bayer pattern filter.

Although the above equations sum absolute first and second derivatives within a 5×5 window surrounding a pixel whose color value is to be estimated, e.g. the pixel at $R_3$, $C_3$ in FIG. 1, those of skill in the art understand that other computations are possible. For example, in a 3×3 window, only the absolute first derivate would be used. Alternatively, in a 7×7, 7×5, or 5×7 window, all of the absolute first, second, and third derivates may be included. Once Gradient Scores in the horizontal and vertical directions, $D^h$ and $D^v$, respectively, are computed, the values are compared to determine an interpolation direction at step 208 of FIG. 2.

If $D^h \leq D^v$, then the missing green pixel value for the pixel at row r and column c, $G_{(r,c)}$, is interpolated in the horizontal direction, illustrated as step 209 of FIG. 2. One possible horizontal interpolation formula is as follows:

$$G_{(r,c)} = \frac{P_{(r,c-1)} + P_{(r,c+1)}}{2} + \frac{2P_{(r,c)} - P_{(r,c-2)} - P_{(r,c+2)}}{8} \quad (6)$$

FIG. 3A illustrates the pixel locations referenced in horizontal interpolation formula (6). The pixel location whose value is to be interpolated is depicted at position (r, c) and shaded with vertical and horizontal lines. Pixel locations whose values are given more weight by formula (6) are shaded with diagonal lines in two directions. Pixel locations who values are given less weight by formula (6) are shaded with diagonal lines in only one direction.

If $D^h > D^v$, then the missing green pixel value for the pixel at row r and column c, $G_{(r,c)}$, is interpolated in the vertical direction, illustrated as step 210 of FIG. 2. One possible vertical interpolation formula is as follows:

$$G_{(r,c)} = \frac{P_{(r-1,c)} + P_{(r+1,c)}}{2} + \frac{2P_{(r,c)} - P_{(r-2,c)} - P_{(r+2,c)}}{8} \quad (7)$$

Figure 3B:
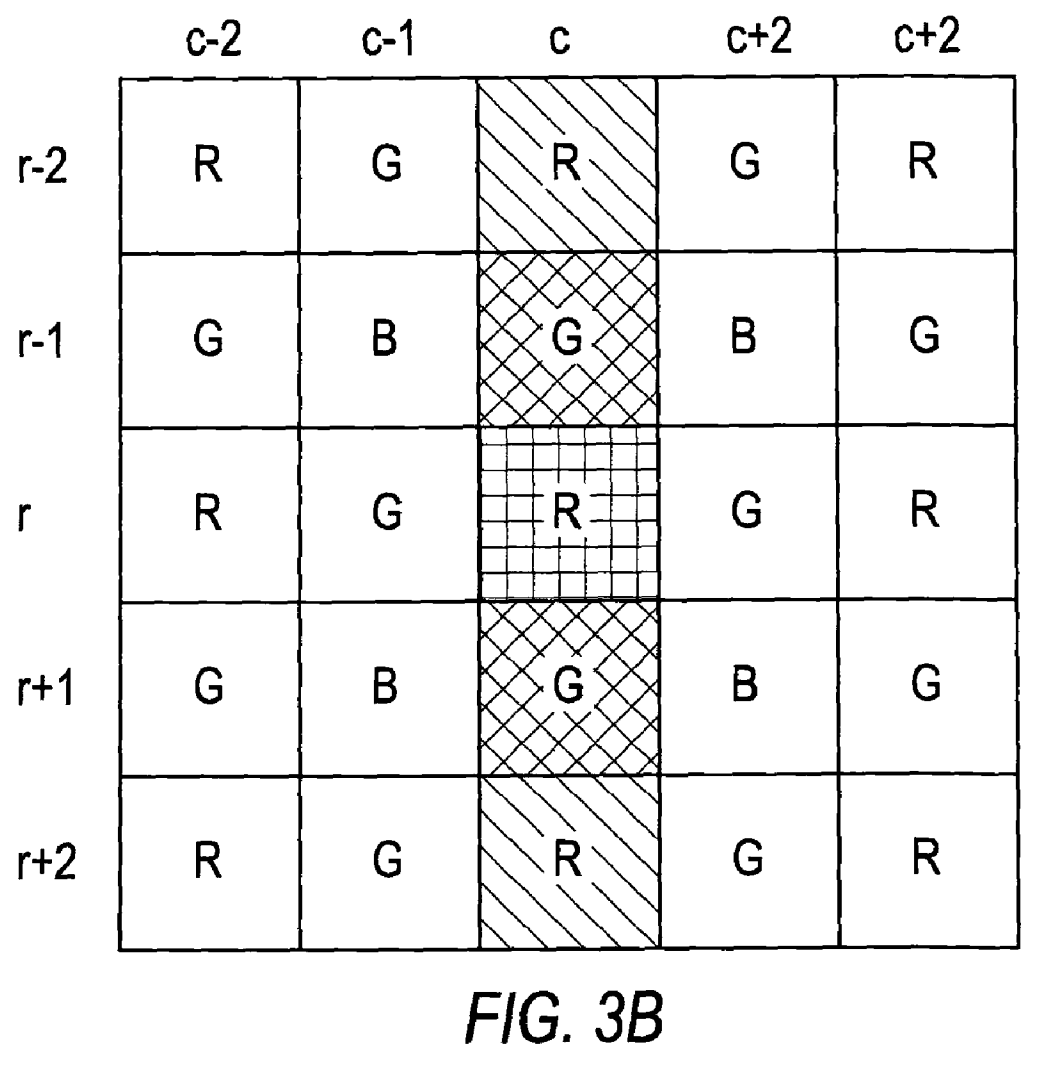

Similarly to FIG. 3A, FIG. 3B illustrates the pixel locations referenced in vertical interpolation formula (7).

In alternative embodiments, the weight given to more distant pixels can be increased or decreased by substituting another number for the 8 in the denominator of the second portion of formulas (6) and (7) above. For example, substituting a 4 would increase the weight given to more distant pixels.

The interpolation direction determination can be refined by considering differences among color channels. For example, Gradient Scores alone may be unable to reliably determine an interpolation direction in areas of the image where pixel values change rapidly. By comparing pixel values across color channels, an interpolation direction can be selected such that the local chroma remains substantially uniform, thereby reducing coloration in the interpolated image. The differences across color channels can be quantified by computing horizontal and vertical Chroma Scores, illustrated as optional step 202 of FIG. 2.

The Chroma Score in the horizontal direction for the pixel at row r and column c, $K_{(r,c)}^h$, can be computed as follows:

$$K^h_{(r,c)} = |E^h_{(r,c)} - F^h_{(r,c)}| + |P_{(r,c)} - F^h_{(r,c)}| \quad (8)$$

$$E^h_{(r,c)} = \frac{P_{(r-1,c-1)} + P_{(r-1,c+1)} + P_{(r+1,c-1)} + P_{(r+1,c+1)}}{4} + \frac{P_{(r-1,c)} + P_{(r+1,c)}}{2} \quad (9)$$

$$F^h_{(r,c)} = \frac{P_{(r,c-1)} + P_{(r,c+1)}}{2} + \frac{2P_{(r,c)} - P_{(r,c-2)} - P_{(r,c+2)}}{8} \quad (10)$$

The Chroma Score in the vertical direction for the pixel at row r and column c, $K_{(r,c)}^v$, can be computed as follows:

$$K^v_{(r,c)} = |E^v_{(r,c)} - F^v_{(r,c)}| + |P_{(r,c)} - F^v_{(r,c)}| \quad (11)$$

$$E^v_{(r,c)} = \frac{P_{(r-1,c-1)} + P_{(r+1,c-1)} + P_{(r-1,c+1)} + P_{(r+1,c+1)}}{4} + \frac{P_{(r,c-1)} + P_{(r,c+1)}}{2} \quad (12)$$

$$F^v_{(r,c)} = \frac{P_{(r-1,c)} + P_{(r+1,c)}}{2} + \frac{2P_{(r,c)} - P_{(r-2,c)} - P_{(r+2,c)}}{8} \quad (13)$$

In alternative embodiments, the weight given to more distant pixels can be increased or decreased by substituting another number for the 8 in the denominator of the second portion of formulas (10) and (13) above. For example, substituting a 4 would increase the weight given to more distant pixels.

The Gradient Scores and Chroma Scores can be combined as follows:

$$M^h = D^h + K^h \quad (14)$$

$$M^v = D^v + K^v \quad (15)$$

If $M^h \leq M^v$, then the missing green pixel value for the pixel at row r and column c, $G_{(r,c)}$, is interpolated in the horizontal direction. If $M^h > M^v$, then the missing green pixel value for the pixel at row r and column c, $G_{(r,c)}$, is interpolated in the vertical direction. As described above, the value of $G_{(r,c)}$ can be computed using interpolation formulas (6) and (7).

The interpolation direction determination can be further refined by considering a difference between a color value associated with the pixel to be interpolated and a color value associated with a surrounding window of pixels. The window might, for example, be a 5×5 window with the pixel to be interpolated at its center. The difference between these pixel and window color values are quantified by computing horizontal and vertical Local Statistical Scores, illustrated as optional step 203 of FIG. 2. Local Statistical Scores are particularly helpful in determining an interpolation direction for portions of an image containing text or other small features.

The Local Statistic Score in the horizontal direction for the pixel at row r and column c, $L_{(r,c)}^h$, can be computed as follows:

$$L^h_{(r,c)} = (P_{(r,c-2)} + P_{(r,c)} + P_{(r,c+2)}) - (P_{(r,c-1)} + P_{(r,c+1)}) - \quad (16)$$

$$\frac{P_{(r-1,c-2)} + P_{(r-1,c)} + P_{(r-1,c+2)}}{2} - \frac{P_{(r+1,c-2)} + P_{(r+1,c)} + P_{(r+1,c+2)}}{2} +$$

$$\frac{P_{(r-2,c-2)} + P_{(r-2,c)} + P_{(r-2,c+2)}}{4} - \frac{P_{(r-2,c-1)} + P_{(r-2,c+1)}}{4} +$$

-continued $$\frac{P_{(r+2,c-2)} + P_{(r+2,c)} + P_{(r+2,c+2)}}{4} - \frac{P_{(r+2,c-1)} + P_{(r+2,c+1)}}{4}$$

The Local Statistic Score in the vertical direction for the pixel at row r and column c, $L_{(r,c)}^v$, can be computed as follows:

$$L^v_{(r,c)} = (P_{(r-2,c)} + P_{(r,c)} + P_{(r+2,c)}) - (P_{(r-1,c)} + P_{(r+1,c)}) - \quad (17)$$

$$\frac{P_{(r-2,c-1)} + P_{(r,c-1)} + P_{(r+2,c-1)}}{2} - \frac{P_{(r-2,c+1)} + P_{(r,c+1)} + P_{(r+2,c+1)}}{2} +$$

$$\frac{P_{(r-2,c-2)} + P_{(r,c-2)} + P_{(r+2,c-2)}}{4} - \frac{P_{(r-1,c-2)} + P_{(r+1,c-2)}}{4} +$$

$$\frac{P_{(r-2,c+2)} + P_{(r,c+2)} + P_{(r+2,c+2)}}{4} - \frac{P_{(r-1,c+2)} + P_{(r+1,c+2)}}{4}$$

A decision step can be incorporated within step 203 to determine whether the Local Statistical Scores should be considered when determining the interpolation direction as follows:

$$\text{if } |M^h - M^v| < \frac{\max(M^h, M^v)}{4} \text{ then} \quad (18)$$

$$N^h = M^h + L^h \quad (19)$$

$$N^v = M^v + L^v \quad (20)$$

If $N^h \leq N^v$, then the missing green pixel value for the pixel at row r and column c, $G_{(r,c)}$, is interpolated in the horizontal direction. If $N^h > N^v$, then the missing green pixel value for the pixel at row r and column c, $G_{(r,c)}$, is interpolated in the vertical direction. As described above, the value of $G_{(r,c)}$ can be computed using interpolation formulas (6) and (7). Alternatively, if the condition of formula (18) is not met, then the interpolation direction can be determined without reference to the Local Statistical Scores, as described above.

In images with high-frequency, orderly patterns, switching between horizontal and vertical interpolation directions in adjacent pixels may result in discontinuities in the interpolated image and crosshatch artifacts. For example, a thin, low-contrast line, such as slats in a distant picket fence, might be broken into pieces, particularly when the input is noisy. Human eyes are sensitive to patterns such as lines, so a demosaicing algorithm preferably preserves them during interpolation.

A low-pass averaging filter can be optionally applied to the horizontal and vertical scores to correct erroneous selection of interpolation direction in small regions of the image, as illustrated at step 204 of FIG. 2. (As used herein, the terms "horizontal score" and "vertical score" refer to the Gradient Score in the horizontal and vertical directions, respectively, either taken alone or in combination with one or more additional scores, such as the Chroma Score or Local Statistical Score, as described in detail above.) The filter causes the interpolation direction determination to be influenced more by surrounding pixels. One possible low-pass filter for a 5×5 window is as follows:

$$f = \begin{bmatrix} 1 & 0 & 1 & 0 & 1 \\ 0 & 1 & 0 & 1 & 0 \\ 1 & 0 & 1 & 0 & 1 \\ 0 & 1 & 0 & 1 & 0 \\ 1 & 0 & 1 & 0 & 1 \end{bmatrix} \div 16 \qquad (21)$$

Small regions in which the interpolation has been erroneously selected can also be mitigated through morphological operations, sometimes called "digital filtering." One possible digital filtering scheme will now be described. Before applying a digital filter, a binary map must be computed, as illustrated at step 205 of FIG. 2. For each pixel $P_{(r,c)}$, i.e. the pixel at row r and column c, assign a value of 1 if the horizontal score at that pixel location is less than or equal to the vertical score. Otherwise, assign a value of 0.

At step 206 of FIG. 2, consider the values assigned to pixel $P_{(r,c)}$ and its 8 neighbors, i.e. the 4 pixels above, below, to the left, and to the right of pixel $P_{(r,c)}$ and the 4 diagonally-neighboring pixels. FIG. 4A depicts pixel $P_{(r,c)}$ shaded with diagonal lines in two directions and the eight neighboring pixels shaded with diagonal lines in only one direction. If 6 or more of these nine pixels are assigned a value of 1, then assign a value of 1 to pixel $P_{(r,c)}$ also. Conversely, if 3 or fewer are assigned a value of 1, then assign a value of 0 to pixel $P_{(r,c)}$. If 4 or 5 are assigned a value of 1, then do not change the value assigned to pixel $P_{(r,c)}$. Pixels assigned a value of 1 are interpolated in the horizontal direction. Pixels assigned a value of 0 are interpolated in the vertical direction.

Alternatively, digital filtering can be performed with reference to only those pixels forming a triangle above or below pixel $P_{(r,c)}$. FIG. 4B depicts pixel $P_{(r,c)}$ shaded with diagonal lines in two directions and the five pixels forming a triangle above shaded with diagonal lines in only one direction. For each pixel $P_{(r,c)}$, i.e. the pixel at row r and column c, assign a value of 1 if the horizontal score at that pixel location is less than or equal to the vertical score. Otherwise, assign a value of 0. Then, consider the values assigned to pixel $P_{(r,c)}$ and, in the case of upper triangle filtering, pixels $P_{(r,c-2)}$, $P_{(r-1,c-1)}$, $P_{(r-2,c)}$, $P_{(r-1,c+1)}$, and $P_{(r,c+2)}$. If 5 or 6 are assigned a value of 1, then assign a value of 1 to pixel $P_{(r,c)}$ also. Conversely, if 0 or 1 are assigned a value of 1, then assign a value of 0 to pixel $P_{(r,c)}$. If 2, 3, or 4 are assigned a value of 1, then do not change the value assigned to pixel $P_{(r,c)}$. As indicated previously, pixels assigned a value of 1 are interpolated in the horizontal direction and pixels assigned a value of 0 are interpolated in the vertical direction.

In instances where the horizontal and vertical scores are similar, the interpolation direction determination is error prone. A "similarity growing region" technique can be used to reduce this error, as illustrated at optional step 207 of FIG. 2. For example, to determine an interpolation direction for pixel $P_{(r,c)}$, a check is performed to determine whether surrounding pixels share a common interpolation direction and whether nearby pixels of the same color as $P_{(r,c)}$ have similar pixel values. If both conditions are satisfied, then a missing pixel value for pixel $P_{(r,c)}$ is interpolated in the same direction as is common to the surrounding pixels.

The similarity growing region technique will now be described with reference to a more specific example, interpolating a green pixel value for the pixel at row r and column c, $P_{(r,c)}$. For each pixel $P_{(r,c)}$, i.e. the pixel at row r and column c, assign a value of 1 if the horizontal score at that pixel location is less than or equal to the vertical score. Otherwise, assign a value of 0. The pixels surrounding $P_{(r,c)}$ can be said to share a common interpolation direction if all of $P_{(r-4,c)}$, $P_{(r-2,c)}$, $P_{(r,c-4)}$, $P_{(r,c-2)}$, $P_{(r-1,c-1)}$, $P_{(r-3,c+1)}$, $P_{(r-5,c+1)}$, $P_{(r+1,c-3)}$, and $P_{(r+1,c-5)}$ are assigned the same binary value, i.e. either 0 or 1. Other green pixels nearby $P_{(r,c)}$ can be said to have a similar pixel values as $P_{(r,c)}$ if the following condition is true:

$$|G_{(r+1,c)} - G_{(r-1,c)}| < T \cdot G_{(r-1,c)} \qquad (22)$$

T is a predetermined threshold determined experimentally. A value of 0.1 is preferred, although other values are possible. If both the common interpolation direction and similar pixel value conditions are satisfied, then pixel $P_{(r,c)}$ is assigned the same binary value, i.e. either 0 or 1, as the surrounding pixels referenced above. If either condition is not satisfied, then the value assigned to pixel $P_{(r,c)}$ is left unchanged. As in the digital filtering process described above, pixels assigned a value of 1 are interpolated in the horizontal direction and pixels assigned a value of 0 are interpolated in the vertical direction.

Several of the techniques just described use a binary map computed by comparing horizontal and vertical scores for each pixel. In a preferred embodiment, the binary map is stored, possibly changed by one or more of the techniques, then passed on to be reused by the next technique. In this manner, the interpolation direction for each pixel is repeatedly refined, resulting in fewer image artifacts.

Thus far, the disclosed embodiments have performed interpolation either horizontally or vertically. However, an alternative interpolation method may be applied to a pixel at the corner of a right angle, as illustrated at step 211 of FIG. 2. For example, if the pixel $P_{(r,c)}$ is the upper-left corner of a region terminating with a right angle, then the corresponding green pixel value, $G_{(r,c)}$, can be computed as follows:

$$G_{(r,c)} = \frac{P_{(r,c-1)} + P_{(r-1,c)}}{2} + \frac{2P_{(r,c)} - P_{(r,c-2)} - P_{(r-2,c)}}{8} \qquad (23)$$

Figure 5A:
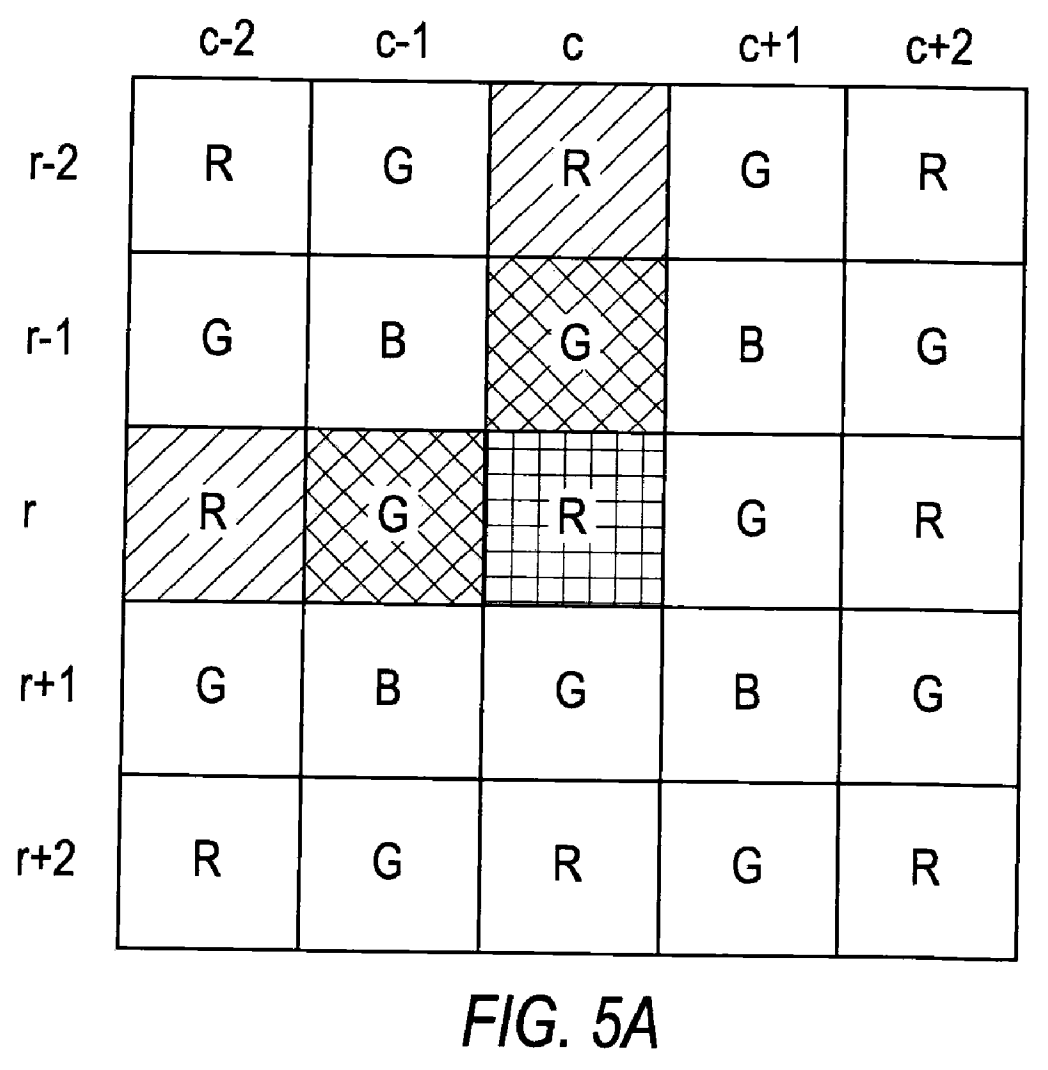

FIG. 5A illustrates the pixel locations referenced in right angle interpolation formula (23). The pixel location whose value is to be interpolated is depicted at position (r, c) and shaded with vertical and horizontal lines. Pixel locations whose values are given more weight by formula (23) are shaded with diagonal lines in two directions. Pixel locations who values are given less weight by formula (23) are shaded with diagonal lines in only one direction.

In alternative embodiments, the weight given to more distant pixels can be increased or decreased by substituting another number for the 8 in the denominator of the second portion of formula (23) above. For example, substituting a 4 would increase the weight given to more distant pixels.

To determine whether a pixel $P_{(r,c)}$ is the corner of a right angle, for each pixel $P_{(r,c)}$, i.e. the pixel at row r and column c, assign a value of 1 if the horizontal score at that pixel location is less than or equal to the vertical score. Otherwise, assign a value of 0. The pixel $P_{(r,c)}$ is determined to be the upper-left corner of a region terminating with a right angle if $P_{(r,c-4)}=1$, $P_{(r,c-2)}=1$, $P_{(r-4,c)}=0$, and $P_{(r-2,c)}=0$. FIG. 5B illustrates these pixel locations. The pixel location whose value is to be interpolated is depicted at position (r, c) and shaded with diagonal lines in two directions. The pixel locations used to determine whether the pixel $P_{(r,c)}$ is the upper-left corner of a region terminating with a right angle are shaded with diagonal lines in only one direction.

Although the exemplary formulas provided herein are for identifying and interpolating a pixel at the upper-left corner of a region terminating with a right angle, one of ordinary skill in the art understands that the pixel references in the formulas can be translated to provide for identification and interpolation of pixels at the upper-right, lower-left, and lower-right corners, as well.

After the green channel is interpolated, the red and blue channels are interpolated by exploiting interchannel correlation, illustrated as step 212 of FIG. 2. In other words, the missing red and blue pixel values are estimated based in part on the interpolated green pixel values. A red pixel value must be estimated for blue pixels, and a blue pixel value must be estimated for red pixels. Both red and blue pixel values must be estimated for green pixels.

A missing blue pixel value for a red pixel at row r and column c, $B_{(r,c)}$, can be estimated with reference to blue and green pixel values for the eight surrounding blue and green pixels as follows:

$$B_{(r,c)} = G_{(r,c)} + \frac{\begin{array}{c}(B_{(r-1,c-1)} - G_{(r-1,c-1)}) + \\ (B_{(r-1,c+1)} - G_{(r-1,c+1)}) + \\ (B_{(r+1,c-1)} - G_{(r+1,c-1)}) + \\ (B_{(r+1,c+1)} - G_{(r+1,c+1)})\end{array}}{4} \quad (24)$$

Note that some of the green pixel values references in formula (24) refer to native green pixel values while others refer to green pixel values that were previously interpolated. In one embodiment, all green pixel values are interpolated first followed by all red and blue pixel values, although this order is not required. For example, the green values in a region of the pixel array could be interpolated, followed by the red and blue pixel values in the same region, followed by green pixel values for another region, and so on.

A missing red pixel value for a blue pixel at row r and column c, $R_{(r,c)}$, can be estimated similarly with reference to native or interpolated red and green pixel values for the eight surrounding red and green pixels.

A missing red pixel value for a native green pixel location at row r and column c, $R_{(r,c)}$, can be estimated as follows:

$$R_{(r,c)} = G_{(r,c)} + \frac{(R_{(r,c-1)} - G_{(r,c-1)}) + (R_{(r,c+1)} - G_{(r,c+1)})}{2} \quad (25)$$

A missing blue pixel value for a native green pixel location at row r and column c, $B_{(r,c)}$, can be estimated similarly.

By computing missing red and blue pixel values for all pixels in the array, all missing pixel values can be reconstructed, resulting in an image with red, green, and blue values for each pixel cell. The following paragraphs describe how to implement embodiments of the disclosure in an imager and a processor system.

Figure 6:
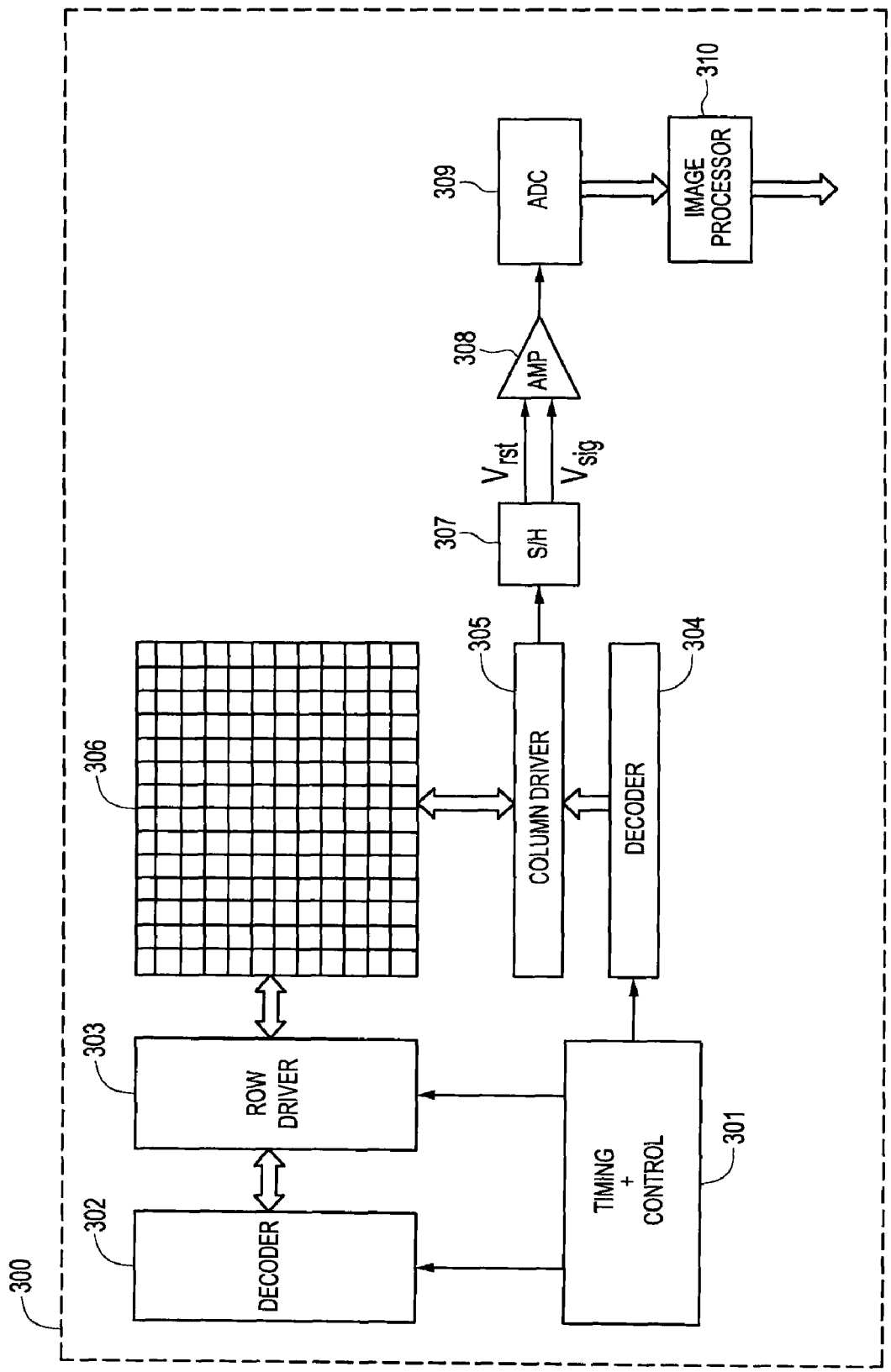
FIG. 6 is a partial top-down block diagram of an imager and associated readout circuitry constructed in accordance with a disclosed embodiment.

FIG. 6 illustrates a partial top-down block diagram view an imager 300 and associated readout circuitry constructed in accordance with an embodiment disclosed herein. Although FIG. 6 illustrates a CMOS imager and associated read-out circuitry, embodiments may employ other types of imagers, for example a CCD imager.

When the imager 300 is operated to capture light, the pixel cells in each row of pixel array 306 are all turned on at the same time by a row select line, and the signals of the pixel cells of each column are selectively output onto output lines by respective column select lines. A plurality of row and column select lines are provided for the array. The row lines are selectively activated in sequence by the row driver 303 in response to row address decoder 302 and the column select lines are selectively activated in sequence for each row activation by the column driver 305 in response to column address decoder 304. Thus, row and column addresses are provided for each pixel cell comprising the pixel array 306. The imager 300 is operated by the timing and control circuit 301, which controls address decoders 302 and 304 for selecting the appropriate row and column select lines for pixel cell read-out, and row and column drivers 303 and 305, which apply driving voltage to the drive transistors of the selected row and column lines.

In a CMOS imager, the pixel output signals typically include a pixel reset signal $V_{rst}$ taken off of the floating diffusion region (via a source follower transistor) when it is reset and a pixel image signal $V_{sig}$, which is taken off the floating diffusion region (via a source follower transistor) after charges generated by an image are transferred to it. The $V_{rst}$ and $V_{sig}$ signals are read by a sample and hold circuit 307 and are subtracted by a differential amplifier 308 that produces a difference signal ($V_{rst}-V_{sig}$) for each pixel cell of pixel array 306, which represents the amount of light impinging on the pixel cell. This signal difference is digitized by an analog-to-digital converter (ADC) 309. The digitized pixel signals are then fed to an image processor 310 which processes the pixel signals and forms a digital image output. It is also possible to have separate driver and read-out circuits for each sub-array with the pixel output from the ADC 309 of each sub-array feeding into a common image processor circuit 310. As depicted in FIG. 6, the imager 300 is formed on a single semiconductor chip, although other configurations are possible, as known in the art.

Image processor circuit 310 may be constructed as a hardware circuit with associated memory, or as a programmed processor with associated memory, or as a combination of a hardware circuit and a programmed processor with associated memory. In one embodiment, the image processor circuit 310 is a pixel signal pipeline processing circuit which performs various operations on image pixel values received from the pixel array 306. In one embodiment, demosaicing in accordance with an embodiment disclosed herein is performed by the image processor circuit 310. Of course, other configurations are possible. For example, demosaicing might be performed by a central processing unit (CPU) connected to the imager 300 by a bus 406, as shown in FIG. 7.

Figure 7:
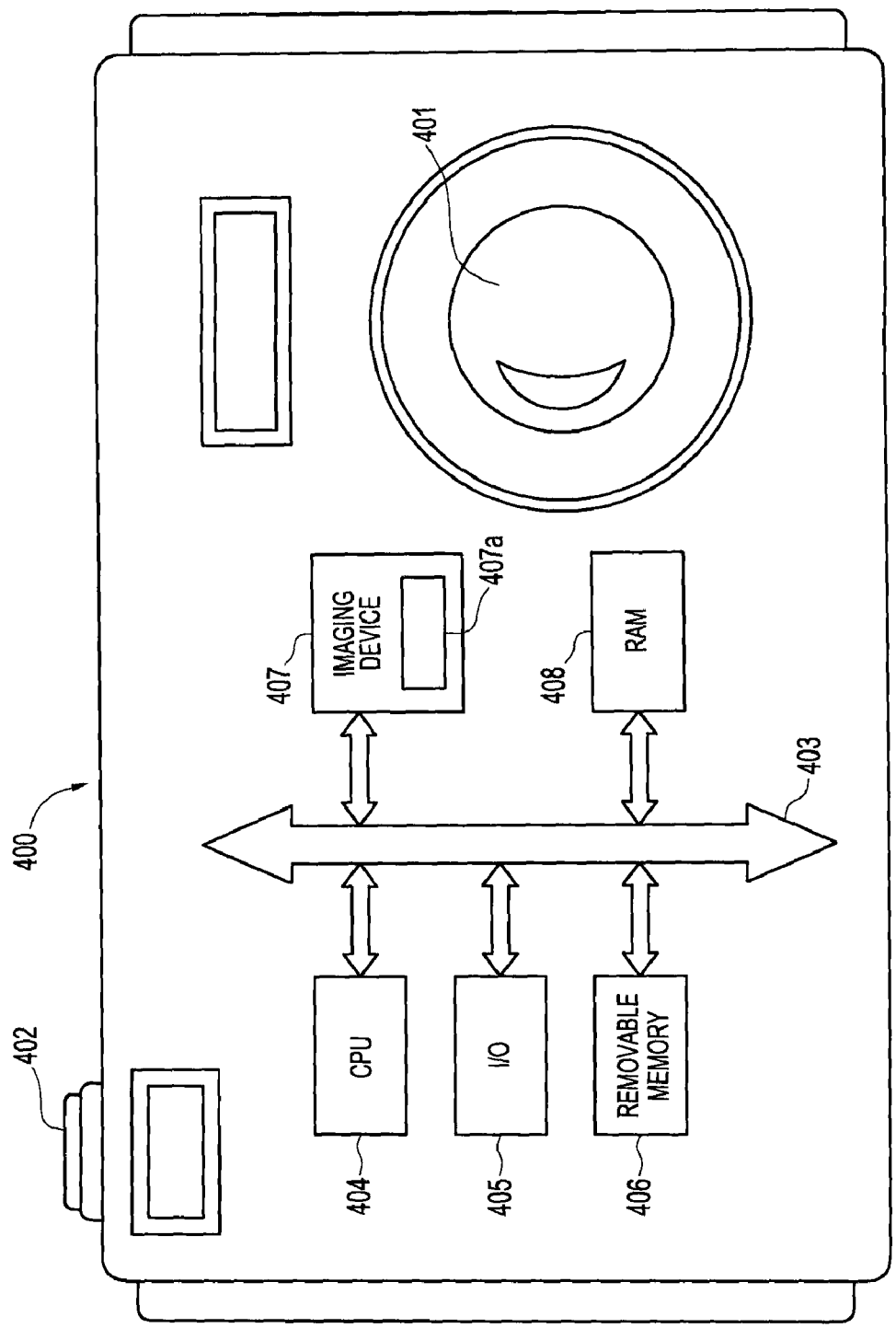
FIG. 7 illustrates a processor system constructed in accordance with a disclosed embodiment.

FIG. 7 shows a typical processor system 400, such as, for example, a digital camera. The system 400 includes a CPU 404 configured to implement demosaicing in accordance with the embodiments disclosed herein. Without being limiting, such a system could also be a personal computer or workstation, camera, scanner, machine vision, vehicle navigation system, video phone, surveillance system, auto focus system, star tracker system, motion detection system, image stabilization system, or any other system able to implement demosaicing in accordance with the disclosed embodiments.

In one embodiment in which the system 400 is a digital camera, the system 400 includes a lens 401 for focusing an image on the imaging device 407 when a shutter release button 402 is pressed. System 400 also comprises a central processing unit (CPU) 404, such as a microprocessor that controls camera functions and image flow, and communicates with an input/output (I/O) device 405 over a bus 403. The CPU 404 might also perform demosaicing, although this could be accomplished by another processor or even a dedicated image processing chip (not shown). The imager of device 400 also communicates with the CPU 404 over the bus 403. The processor-based system 400 also includes random access memory (RAM) 408, and can include removable memory 406, such as flash memory, which also communicates with the CPU 404 over the bus 403. The imaging device 407 may be combined with the CPU 404, with or without memory storage on a single integrated circuit or on a different chip than the CPU.

In another embodiment, the system 400 is a personal computer comprising a CPU 404, which communicates with an I/O device 405 and RAM 408 over a bus 403. In this embodiment, the system 400 does not necessarily include an imaging device 407. Rather, digital pixel values are transferred from another device, for example a digital camera, via the I/O device 405. The digital pixel values may be in the form of a RAW image file generated by a digital camera or any other format that retains digital pixel values corresponding to pixel cells of an imaging device. The I/O device might be, for example, a USB port, a memory card reader, a network port, a parallel port, a serial port, a FireWire port, a floppy disk drive, an optical disk drive, or a wireless transceiver. Once loaded in a memory, for example RAM 408 or possibly non-volatile storage such as a hard drive (not shown), the CPU 404 performs demosaicing in accordance with the embodiments disclosed herein. The resulting image might then be saved in a memory, output via an output device, for example a photo printer, posted on the Internet, or manipulated further by software, such as, for example, Adobe Photoshop®.

While embodiments of the invention have been described in detail in connection with the examples known at the time, it should be readily understood that they are not limited to such disclosed embodiments. Rather, they can be modified to incorporate any number of variations, alterations, substitutions, or equivalent arrangements not heretofore described. Accordingly, the invention is not to be seen as limited by the foregoing description, but is only limited by the scope of the claims.

What is claimed is:

1. A method for determining a missing color pixel value of an image pixel of an imager pixel array, the method comprising:

computing horizontal and vertical scores associated with the missing color pixel value based at least in part on pixel values of pixels not in the same row or column of the imager pixel array as the image pixel having the missing color pixel value;

selecting an interpolation direction for the pixel having the missing color pixel value based at least in part on a comparison of the horizontal and vertical scores; and estimating the missing color pixel value by interpolating in the selected interpolation direction, wherein the horizontal score comprises a horizontal gradient score for quantifying a change in pixel values in a horizontal direction and the vertical score comprises a vertical gradient score for quantifying a change in pixel values in a vertical direction, and wherein the horizontal gradient score, $D_{(r,c)}^h$, is computed as follows:

$$D_{(r,c)}^h = S_{(r,c)}^h + \frac{S_{(r-1,c)}^h + S_{(r+1,c)}^h}{2} + \frac{S_{(r-2,c)}^h + S_{(r+2,c)}^h}{N}$$

$$S_{(r,c)}^h = |P_{(r,c-1)} - P_{(r,c+1)}| + |2P_{(r,c)} - P_{(r,c-2)} - P_{(r,c+2)}|$$

$$S_{(r-1,c)}^h = |P_{(r-1,c-1)} - P_{(r-1,c+1)}| + |2P_{(r-1,c)} - P_{(r-1,c-2)} - P_{(r-1,c+2)}|$$

$$S_{(r+1,c)}^h = |P_{(r+1,c-1)} - P_{(r+1,c+1)}| + |2P_{(r+1,c)} - P_{(r+1,c-2)} - P_{(r+1,c+2)}|$$

-continued $$S_{(r-2,c)}^h = |P_{(r-2,c-1)} - P_{(r-2,c+1)}| + |2P_{(r-2,c)} - P_{(r-2,c-2)} - P_{(r-2,c+2)}|$$

$$S_{(r+2,c)}^h = |P_{(r+2,c-1)} - P_{(r+2,c+1)}| + |2P_{(r+2,c)} - P_{(r+2,c-2)} - P_{(r+2,c+2)}|$$

and the vertical gradient score, $D_{(r,c)}^v$, is computed as follows:

$$D_{(r,c)}^v = S_{(r,c)}^v + \frac{S_{(r,c-1)}^v + S_{(r,c+1)}^v}{2} + \frac{S_{(r,c-2)}^v + S_{(r,c+2)}}{N}$$

$$S_{(r,c)}^v = |P_{(r-1,c)} - P_{(r+1,c)}| + |2P_{(r,c)} - P_{(r-2,c)} - P_{(r+2,c)}|$$

$$S_{(r,c-1)}^v = |P_{(r-1,c-1)} - P_{(r+1,c-1)}| +$$
$$= |2P_{(r,c-1)} - P_{(r-2,c-1)} - P_{(r+2,c-1)}|$$

$$S_{(r,c+1)}^v = |P_{(r-1,c+1)} - P_{(r+1,c+1)}| + |2P_{(r,c+1)} - P_{(r-2,c+1)} - P_{(r+2,c+1)}|$$

$$S_{(r,c-2)}^v = |P_{(r-1,c-2)} - P_{(r+1,c-2)}| + |2P_{(r,c-2)} - P_{(r-2,c-2)} - P_{(r+2,c-2)}|$$

$$S_{(r,c+2)}^v = |P_{(r-1,c+2)} - P_{(r+1,c+2)}| + |2P_{(r,c+2)} - P_{(r-2,c+2)} - P_{(r+2,c+2)}|$$

wherein $P_{(r,c)}$ represents a native pixel value of a pixel located at row r and column c of the imager pixel array and N is a number greater than 2.

2. The method of claim 1, wherein N is one of 4 and 8.

3. A method for determining a missing color pixel value of an image pixel of an imager pixel array, the method comprising:

computing horizontal and vertical scores associated with the missing color pixel value based at least in part on pixel values of pixels not in the same row or column of the imager pixel array as the image pixel having the missing color pixel value;

selecting an interpolation direction for the pixel having the missing color pixel value based at least in part on a comparison of the horizontal and vertical scores; and estimating the missing color pixel value by interpolating in the selected interpolation direction, wherein the horizontal score comprises a horizontal gradient score for quantifying a change in pixel values in a horizontal direction and the vertical score comprises a vertical gradient score for quantifying a change in pixel values in a vertical direction, wherein the horizontal score further comprises a horizontal chroma score for quantifying a chroma of pixels in a window surrounding the pixel having the missing color pixel value in a horizontal direction and the vertical score further comprises a vertical chroma score for quantifying a chroma of pixels in a window surrounding the pixel having the missing color pixel value in a vertical direction, and wherein the horizontal chroma score, $K_{(r,c)}^h$, is computed as follows:

$$K_{(r,c)}^h = |E_{(r,c)}^h - F_{(r,c)}^h| + |P_{(r,c)} - F_{(r,c)}^h|$$

$$E_{(r,c)}^h = \frac{P_{(r-1,c-1)} + P_{(r-1,c+1)} + P_{(r+1,c-1)} + P_{(r+1,c+1)}}{4} + \frac{P_{(r-1,c)} + P_{(r+1,3)}}{2}$$

$$F_{(r,c)}^h = \frac{P_{(r,c-1)} + P_{(r,c+1)}}{2} + \frac{2P_{(r,c)} - P_{(r,c-2)} - P_{(r,c+2)}}{N}$$

and the vertical chroma score, $K_{(r,c)}^v$, is computed as follows:

$$K_{(r,c)}^v = |E_{(r,c)}^v - F_{(r,c)}^v| + |P_{(r,c)} - F_{(r,c)}^v|$$

$$E_{(r,c)}^v = \frac{P_{(r-1,c-1)} + P_{(r+1,c-1)} + P_{(r-1,c+1)} + P_{(r+1,c+1)}}{4} + \frac{P_{(r,c-1)} + P_{(r,c+1)}}{2}$$

$$F_{(r,c)}^v = \frac{P_{(r-1,c)} + P_{(r+1,c)}}{2} + \frac{2P_{(r,c)} - P_{(r-2,c)} - P_{(r+2,c)}}{N}$$

wherein $P_{(r,c)}$ represents a native pixel value of a pixel located at row r and column c of the imager pixel array and N is a number greater than 2.

4. The method of claim 3, further comprising adding the horizontal chroma score to the horizontal gradient score to yield a horizontal sum and adding the vertical chroma score to the vertical gradient score to yield a vertical sum, wherein a horizontal interpolation direction is selected if the horizontal sum is less than or equal to the vertical sum and a vertical interpolation direction is selected if the horizontal sum is greater than the vertical sum.

5. A method for determining a missing color pixel value of an image pixel of an imager pixel array, the method comprising:
computing horizontal and vertical scores associated with the missing color pixel value based at least in part on pixel values of pixels not in the same row or column of the imager pixel array as the image pixel having the missing color pixel value;
selecting an interpolation direction for the pixel having the missing color pixel value based at least in part on a comparison of the horizontal and vertical scores; and
estimating the missing color pixel value by interpolating in the selected interpolation direction,
wherein the horizontal score comprises a horizontal gradient score for quantifying a change in pixel values in a horizontal direction and the vertical score comprises a vertical gradient score for quantifying a change in pixel values in a vertical direction, and
wherein the horizontal score further comprises a horizontal local statistical score, $L_{(r,c)}^h$, and the vertical score further comprises a vertical local statistical score, $L_{(r,c)}^v$, wherein $L_{(r,c)}^h$ and $L_{(r,c)}^v$ are computed as follows:

$$L_{(r,c)}^h = (P_{(r,c-2)} + P_{(r,c)} + P_{(r,c+2)}) - (P_{(r,c-1)} + P_{(r,c+1)}) -$$
$$\frac{P_{(r-1,c-2)} + P_{(r-1,c)} + P_{(r-1,c+2)}}{2} - \frac{P_{(r+1,c-2)} + P_{(r+1,c)} + P_{(r+1,c+2)}}{2} +$$
$$\frac{P_{(r-2,c-2)} + P_{(r-2,c)} + P_{(r-2,c+2)}}{4} - \frac{P_{(r-2,c-1)} + P_{(r-2,c+1)}}{4} +$$
$$\frac{P_{(r+2,c-2)} + P_{(r+2,c)} + P_{(r+2,c+2)}}{4} - \frac{P_{(r+2,c-1)} + P_{(r+2,c+1)}}{4}$$

$$L_{(r,c)}^v = (P_{(r-2,c)} + P_{(r,c)} + P_{(r+2,c)}) - (P_{(r-1,c)} + P_{(r+1,c)}) -$$
$$\frac{P_{(r-2,c-1)} + P_{(r,c-1)} + P_{(r+2,c-1)}}{2} - \frac{P_{(r-2,c+1)} + P_{(r,c+1)} + P_{(r+2,c+1)}}{2} +$$
$$\frac{P_{(r-2,c-2)} + P_{(r,c-2)} + P_{(r+2,c-2)}}{4} - \frac{P_{(r-1,c-2)} + P_{(r+1,c-2)}}{4} +$$

-continued
$$\frac{P_{(r-2,c+2)} + P_{(r,c+2)} + P_{(r+2,c+2)}}{4} - \frac{P_{(r-1,c+2)} + P_{(r+1,c+2)}}{4}$$

wherein $P_{(r,c)}$ represents a native pixel value of a pixel located at row r and column c of the imager pixel array.

6. A method for determining a missing color pixel value of an image pixel of an imager pixel array, the method comprising:
computing horizontal and vertical scores associated with the missing color pixel value based at least in part on pixel values of pixels not in the same row or column of the imager pixel array as the image pixel having the missing color pixel value;
selecting an interpolation direction for the pixel having the missing color pixel value based at least in part on a comparison of the horizontal and vertical scores; and
estimating the missing color pixel value by interpolating in the selected interpolation direction,
wherein the missing color pixel value is a green pixel value and the missing color pixel value, $G_{(r,c)}$, is interpolated as follows:
if a horizontal interpolation direction is selected:

$$G_{(r,c)} = \frac{P_{(r,c-1)} + P_{(r,c+1)}}{2} + \frac{2P_{(r,c)} - P_{(r,c-2)} - P_{(r,c+2)}}{N}$$

if a vertical interpolation direction is selected:

$$G_{(r,c)} = \frac{P_{(r-1,c)} + P_{(r+1,c)}}{2} + \frac{2P_{(r,c)} - P_{(r-2,c)} - P_{(r+2,c)}}{N}$$

wherein $P_{(r,c)}$ represents a native pixel value of a pixel located at row r and column c of the imager pixel array and N is a number greater than 2.

7. The method of claim 1, further comprising applying a low-pass filter to the horizontal and vertical scores before the selecting step.

8. A method for determining a missing color pixel value of an image pixel of an imager pixel array, the method comprising:
computing horizontal and vertical scores associated with the missing color pixel value based at least in part on pixel values of pixels not in the same row or column of the imager pixel array as the image pixel having the missing color pixel value;
selecting an interpolation direction for the pixel having the missing color pixel value based at least in part on a comparison of the horizontal and vertical scores;
estimating the missing color pixel value by interpolating in the selected interpolation direction; and
refining the interpolation direction selected for the pixel having the missing color pixel value by comparing the selected interpolation direction for the pixel having the missing color pixel value to interpolation directions selected for neighboring pixels having missing color pixel values, and
wherein the selected interpolation direction for the pixel having the missing color pixel value is changed to match a common interpolation direction if at least a threshold number of neighboring pixel having missing pixel values share the common interpolation direction.

9. A method for determining a missing color pixel value of an image pixel of an imager pixel array, the method comprising:

computing horizontal and vertical scores associated with the missing color pixel value based at least in part on pixel values of pixels not in the same row or column of the imager pixel array as the image pixel having the missing color pixel value;

selecting an interpolation direction for the pixel having the missing color pixel value based at least in part on a comparison of the horizontal and vertical scores;

estimating the missing color pixel value by interpolating in the selected interpolation direction;

identifying a region of pixels having missing color pixel values sharing a common interpolation direction; and changing an interpolation direction of a pixel having a missing color pixel value adjacent to the region to the common interpolation direction, if a native pixel value associated with the pixel having the missing color pixel value is within a threshold percentage of a pixel value of a pixel within the region.

10. The method of claim 9, wherein the interpolation direction of the pixel having the missing color pixel value adjacent to the region is changed to the common interpolation direction if the following condition is true:

$$|G_{(r+1,c)} - G_{(r-1,c)}| < T \cdot G_{(r-1,c)}$$

wherein $G_{(r,c)}$ represents the green pixel value of a pixel located at row r and column c of the imager pixel array and T is the threshold percentage.

11. The method of claim 10, wherein T equals 0.1.

12. A method for determining a missing color pixel value of an image pixel of an imager pixel array, the pixel having the missing color pixel value being located at a corner of an image feature, the method comprising:

determining that the pixel having the missing color pixel value is at a corner of an image region;

selecting an interpolation direction based at least in part on whether the corner is an upper-left, upper-right, lower-left, or lower-right corner; and estimating the missing color pixel value by interpolating in the selected interpolation direction wherein the pixel having the missing color pixel value is a green pixel, the pixel having the missing color pixel value is determined to be an upper-left corner, and the missing color pixel value, $G_{(r,c)}$, is interpolated as follows:

$$G_{(r,c)} = \frac{P_{(r,c-1)} + P_{(r-1,c)}}{2} + \frac{2P_{(r,c)} - P_{(r,c-2)} - P_{(r-2,c)}}{N}$$

wherein $P_{(r,c)}$ represents a native pixel value of a pixel located at row r and column c of the imager pixel array and N is a number greater than 2.

13. An imager, comprising:

a color pixel array comprising pixels organized into rows and columns; and a processor configured to receive image data from the pixel array and determine a missing color pixel value of an image pixel location by:

determining horizontal and vertical scores associated with the pixel having the missing color pixel value based at least in part on pixel values of pixels not in the same row or column as the pixel having the missing color pixel value;

selecting an interpolation direction for the pixel having the missing color pixel value based at least in part on a comparison of the horizontal and vertical scores; and estimating the missing color pixel value by interpolating in the selected interpolation direction, wherein the horizontal score comprises a horizontal gradient score for quantifying a change in pixel values in a horizontal direction and the vertical score comprises a vertical gradient score for quantifying a change in pixel values in a vertical direction, and wherein the horizontal gradient score, $D_{(r,c)}^h$, is computed as follows:

$$D_{(r,c)}^h = S_{(r,c)}^h + \frac{S_{(r-1,c)}^h + S_{(r+1,c)}^h}{2} + \frac{S_{(r-2,c)}^h + S_{(r+2,c)}^h}{N}$$

$$S_{(r,c)}^h = |P_{(r,c-1)} - P_{(r,c+1)}| + |2P_{(r,c)} - P_{(r,c-2)} - P_{(r,c+2)}|$$

$$S_{(r-1,c)}^h = |P_{(r-1,c-1)} - P_{(r-1,c+1)}| + |2P_{(r-1,c)} - P_{(r-1,c-2)} - P_{(r-1,c+2)}|$$

$$S_{(r+1,c)}^h = |P_{(r+1,c-1)} - P_{(r+1,c+1)}| + |2P_{(r+1,c)} - P_{(r+1,c-2)} - P_{(r+1,c+2)}|$$

$$S_{(r-2,c)}^h = |P_{(r-2,c-1)} - P_{(r-2,c+1)}| + |2P_{(r-2,c)} - P_{(r-2,c-2)} - P_{(r-2,c+2)}|$$

$$S_{(r+2,c)}^h = |P_{(r+2,c-1)} - P_{(r+2,c+1)}| + |2P_{(r+2,c)} - P_{(r+2,c-2)} - P_{(r+2,c+2)}|$$

select an interpolation direction for the pixel having the missing color pixel value based at least in part on a comparison of the horizontal and vertical scores; and estimate the missing color pixel value by interpolating in the selected interpolation direction, wherein the horizontal score comprises a horizontal gradient score for quantifying a change in pixel values in a horizontal direction and the vertical score comprises a vertical gradient score for quantifying a change in pixel values in a vertical direction, and wherein the horizontal gradient score, $D_{(r,c)}^h$, is computed as follows:

$$D_{(r,c)}^h = S_{(r,c)}^h + \frac{S_{(r-1,c)}^h + S_{(r+1,c)}^h}{2} + \frac{S_{(r-2,c)}^h + S_{(r+2,c)}^h}{N}$$

$$S_{(r,c)}^h = |P_{(r,c-1)} - P_{(r,c+1)}| + |2P_{(r,c)} - P_{(r,c-2)} - P_{(r,c+2)}|$$

$$S_{(r-1,c)}^h = |P_{(r-1,c-1)} - P_{(r-1,c+1)}| + |2P_{(r-1,c)} - P_{(r-1,c-2)} - P_{(r-1,c+2)}|$$

$$S_{(r+1,c)}^h = |P_{(r+1,c-1)} - P_{(r+1,c+1)}| + |2P_{(r+1,c)} - P_{(r+1,c-2)} - P_{(r+1,c+2)}|$$

$$S_{(r-2,c)}^h = |P_{(r-2,c-1)} - P_{(r-2,c+1)}| + |2P_{(r-2,c)} - P_{(r-2,c-2)} - P_{(r-2,c+2)}|$$

$$S_{(r+2,c)}^h = |P_{(r+2,c-1)} - P_{(r+2,c+1)}| + |2P_{(r+2,c)} - P_{(r+2,c-2)} - P_{(r+2,c+2)}|$$

and the vertical gradient score, $D_{(r,c)}^v$, is computed as follows:

$$D_{(r,c)}^v = S_{(r,c)}^v + \frac{S_{(r,c-1)}^v + S_{(r,c+1)}^v}{2} + \frac{S_{(r,c-2)}^v + S_{(r,c+2)}^v}{N}$$

$$S_{(r,c)}^v = |P_{(r-1,c)} - P_{(r+1,c)}| + |2P_{(r,c)} - P_{(r-2,c)} - P_{(r+2,c)}|$$

$$S_{(r,c)}^v = |P_{(r-1,c)} - P_{(r+1,c)}| + |2P_{(r,c)} - P_{(r-2,c)} - P_{(r+2,c)}|$$

and the vertical gradient score, $D_{(r,c)}^v$, is computed as follows:

$$D_{(r,c)}^v = S_{(r,c)}^v + \frac{S_{(r,c-1)}^v + S_{(r,c+1)}^v}{2} + \frac{S_{(r,c-2)}^v + S_{(r,c+2)}^v}{N}$$

$$S_{(r,c)}^v = |P_{(r-1,c)} - P_{(r+1,c)}| + |2P_{(r,c)} - P_{(r-2,c)} - P_{(r+2,c)}|$$

$$S_{(r,c-1)}^v = |P_{(r-1,c-1)} - P_{(r+1,c-1)}| + |2P_{(r,c-1)} - P_{(r-2,c-1)} - P_{(r+2,c-1)}|$$

$$S_{(r,c+1)}^v = |P_{(r-1,c+1)} - P_{(r+1,c+1)}| + |2P_{(r,c+1)} - P_{(r-2,c+1)} - P_{(r+2,c+1)}|$$

$$S_{(r,c-2)}^v = |P_{(r-1,c-2)} - P_{(r+1,c-2)}| + |2P_{(r,c-2)} - P_{(r-2,c-2)} - P_{(r+2,c-2)}|$$

$$S_{(r,c+2)}^v = |P_{(r-1,c+2)} - P_{(r+1,c+2)}| + |2P_{(r,c+2)} - P_{(r-2,c+2)} - P_{(r+2,c+2)}|$$

wherein $P_{(r,c)}$ represents a native pixel value of a pixel located at row r and column c of the color pixel array and N is a number greater than 2.

14. A system for supplying a missing pixel color value in image data, the system comprising:
an input device configured to provide image data; and
a processor configured to:
receive input from the input device;
compute horizontal and vertical scores associated with a pixel having the missing color pixel value based at least in part on pixel values of pixels not in the same row or column of an imager pixel array as the pixel having the missing color pixel value;

$$S_{(r,c-1)}^v = |P_{(r-1,c-1)} - P_{(r+1,c-1)}| + |2P_{(r,c-1)} - P_{(r-2,c-1)} - P_{(r+2,c-1)}|$$

$$S_{(r,c+1)}^v = |P_{(r-1,c+1)} - P_{(r+1,c+1)}| + |2P_{(r,c+1)} - P_{(r-2,c+1)} - P_{(r+2,c+1)}|$$

$$S_{(r,c-2)}^v = |P_{(r-1,c-2)} - P_{(r+1,c-2)}| + |2P_{(r,c-2)} - P_{(r-2,c-2)} - P_{(r+2,c-2)}|$$

$$S_{(r,c+2)}^v = |P_{(r-1,c+2)} - P_{(r+1,c+2)}| + |2P_{(r,c+2)} - P_{(r-2,c+2)} - P_{(r+2,c+2)}|$$

wherein $P_{(r,c)}$ represents a native pixel value of a pixel located at row r and column c of the imager pixel array and N is a number greater than 2.

\* \* \* \* \*